(12) United States Patent
Laird

(10) Patent No.: US 7,735,077 B2
(45) Date of Patent: *Jun. 8, 2010

(54) SYSTEM AND METHOD FOR INVENTORY SERVICES

(75) Inventor: Peter Laird, Superior, CO (US)

(73) Assignee: BEA Systems, Inc., Redwood Shores, CA (US)

( * ) Notice: Subject to any disclaimer, the term of this patent is extended or adjusted under 35 U.S.C. 154(b) by 1151 days.

This patent is subject to a terminal disclaimer.

(21) Appl. No.: 11/121,143

(22) Filed: May 3, 2005

(65) Prior Publication Data

US 2005/0268282 A1 Dec. 1, 2005

Related U.S. Application Data

(60) Provisional application No. 60/568,208, filed on May 5, 2004.

(51) Int. Cl.
*G06F 9/44* (2006.01)
*G06F 17/30* (2006.01)

(52) U.S. Cl. ............... 717/170; 717/173; 707/610; 713/100

(58) Field of Classification Search ............ 717/120, 717/122
See application file for complete search history.

(56) References Cited

U.S. PATENT DOCUMENTS

| | | | | |
|---|---|---|---|---|
| 5,919,247 | A * | 7/1999 | Van Hoff et al. | 709/217 |
| 6,385,652 | B1 * | 5/2002 | Brown et al. | 709/227 |
| 6,629,316 | B1 * | 9/2003 | Curtis | 717/174 |
| 6,763,517 | B2 * | 7/2004 | Hines | 717/124 |
| 2003/0084424 | A1 * | 5/2003 | Reddy et al. | 717/105 |
| 2003/0182652 | A1 * | 9/2003 | Custodio | 717/122 |
| 2004/0103393 | A1 * | 5/2004 | Reddy et al. | 717/122 |
| 2004/0181790 | A1 * | 9/2004 | Herrick | 717/168 |

* cited by examiner

*Primary Examiner*—James Rutten
(74) *Attorney, Agent, or Firm*—Fliesler Meyer LLP

(57) ABSTRACT

In accordance with embodiments, there are provided mechanisms and methods for determining a select set of changes from a set of changes made to an application instance to propagate to one or more other application instances. These mechanisms and methods can enable embodiments to propagate changes from a first application instance in a first environment to a second application instance in a second environment. For example, an embodiment can enable changes to be made to a test version in a test environment, tested and then propagated to a production version of the application residing in a production environment. The ability of embodiments to propagate changes to other application instances across environments can enable easy capture and transferal of changes to an application.

26 Claims, 6 Drawing Sheets

SYSTEM AND METHOD FOR INVENTORY SERVICES

PRIORITY CLAIM

The U.S. patent application claims the benefit of the following U.S. Provisional Patent Application, the entire disclosure of which is incorporated herein by reference:

U.S. Provisional Patent Application No. 60/568,208, entitled SYSTEM AND METHOD FOR PROPAGATION OF APPLICATIONS by Peter Laird, filed on May 5, 2004.

CROSS REFERENCE TO RELATED APPLICATIONS

The following commonly owned, co-pending U.S. patents and patent applications, including the present application, are related to each other. Each of the other patents/applications are incorporated by reference herein in its entirety:

U.S. patent application Ser. No. 11/121,143 entitled SYSTEM AND METHOD FOR INVENTORY SERVICES, by Peter Laird, filed on May 5, 2005; and U.S. patent application Ser. No. 11/210,855 entitled SYSTEM AND METHOD FOR APPLICATION PROPAGATION, by Peter Laird, filed on May 5, 2005.

FIELD OF THE INVENTION

The present invention relates generally to systems, methods, and computer readable media for managing portal applications. The present invention relates particularly to the propagation of portal application data.

BACKGROUND OF THE INVENTION

Since its inception in 1995, the Java® programming language (Java® is a registered trademark of Sun Microsystems, Inc.) has become increasingly popular. Java, which is an interpreted language, enabled the creation of applications that could be run on a wide variety of platforms, i.e., so called "platform independent applications." This ability to function across a variety of different client platforms and Java's relatively easy implementation of network applications has resulted in its use in endeavors as basic as personal webpages to endeavors as complex as large business-to-business enterprise systems.

As Java has become more commonplace, a wide variety of tools and development platforms have been created to assist developers in the creation and implementation of platform independent applications using Java or other languages that support platform independent applications. One such type of platform independent application is the web portal. A web portal is a World Wide Web site whose purpose is to be a starting point for a wide variety of users when these users connect to the Web. Thus, a number of products have arisen to assist in the design of customized web portals that provide tools and integrate previously generated content. These products provide graphics, content, sample portlets, i.e., applications that can run within a web portal, and tools for interacting with and modifying the same.

One commonly used function of such tools is the backup and propagation of portal applications. Often a developer will wish to modify an application in a development and testing environment first before propagating the changes to a version of the application that is part of a working portal, i.e., the "working setting" or "production environment." After testing the modified application in the testing environment, the developer then passes the changes to the version of the application in the working setting.

However, these applications can be difficult to configure and often store relevant data in a variety of difficult-to-identify locations. This makes the task of accurately propagating the changes to the version of the application in the working setting highly unreliable and time consuming.

What is needed is a tool for propagating portal applications that allows for the easy capture and transferal of changes to an application.

DETAILED DESCRIPTION

Figure 1:
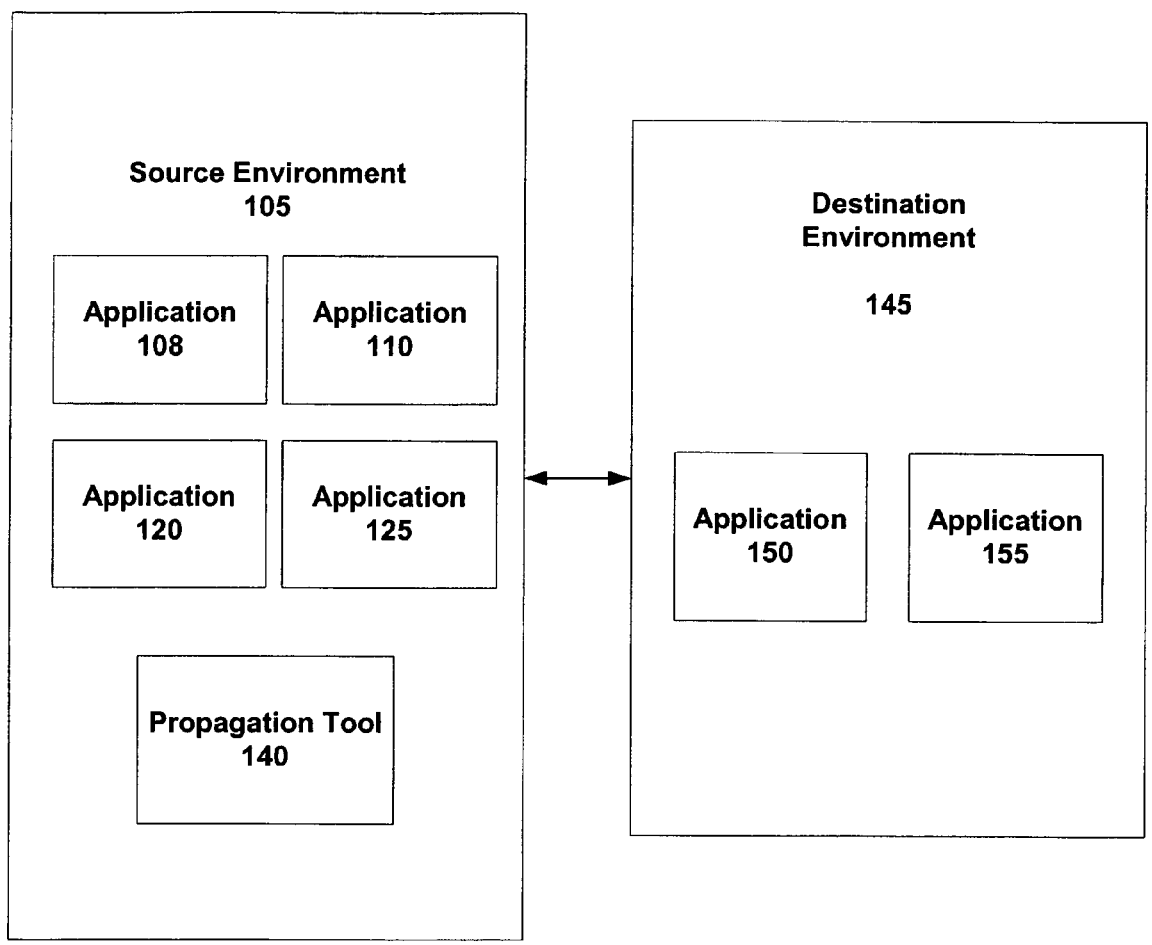
FIG. 1 illustrates a high-level overview of an interaction between a source environment and a destination environment in an embodiment.

In accordance with embodiments, there are provided mechanisms and methods for determining a select set of changes from a set of changes made to an application instance to propagate to one or more other application instances. These mechanisms and methods can enable embodiments to propagate changes from a first application instance in a first environment to a second application instance in a second environment. For example, an embodiment can enable changes to be made to a test version in a test environment, tested and then propagated to a production version of the application residing in a production environment. The ability of embodiments to propagate changes to other application instances across environments can enable easy capture and transferal of changes to an application.

In an embodiment, a method for determining a select set of changes made to an application to propagate. The method includes determining a unique identifier for at least one item of information related to a first version of an application. One or more unique identifiers can form a first inventory associated with the first version of the application. In response to receiving a second inventory comprising at least one unique identifier for at least one item of information related to a second version of the application, a set of differences between the first version of the application and the second version of the application can be determined by comparison of the first inventory and the second inventory. The set of differences can be provided as changes to be propagated to a second version of the application.

As used herein, the term application is intended to be broadly construed to include any data entry, update, query or program that processes data on behalf of a user, including without limitation network based applications, web based server resident applications, web portals, search engines, photographic, audio or video information storage applications, e-Commerce applications, backup or other storage applications, sales/revenue planning, marketing, forecasting, accounting, inventory management applications and other business applications. Users may be human or computational entities. As used herein, the term environment is intended to be broadly construed to include a set of any characteristics of a computer configuration, including hardware and software characteristics, such as without limitation, operating system, Central Processor Unit (CPU) model, data communications systems, database systems, programming languages and any applicable standards. As used herein, the term residing is intended to be broadly construed to include applications loaded into active memory, persisted in storage, being executed by a processor and other associations between applications and environments known in the computing arts. As used herein the term inventory is defined as one or more identifiers associated with one or more data items. The term data items is intended to be broadly construed to include without limitation configuration data, render data, user customization information, user data, and any other data capable of being associated with an application.

In another embodiment, a method for propagating changes from an application instance in a first environment to an application instance in a second environment is provided. The method includes generating a first inventory of data items by associating a unique identifier with each data item accessible to a first version of the application residing in the first environment. A second inventory of data items is generated by associating a unique identifier with each data item accessible to the second version of the application residing in the second environment. For example, the second version may be formed by migrating the first version of the application to the second environment. A set of changes to be made to the second version is determined by comparing corresponding unique identifiers from the first inventory and the second inventory to determine a difference. The difference indicates changes made to the first version of the application that can be propagated to the second version of the application.

In an embodiment, the inventories comprise an inventory services layer that is located within an application deployed in source and destination environments. The inventory services layer can be configured to locate and return configuration data and other data for the application and return it to a requesting agent. The inventory services layer abstracts the requests for data such that the requesting agent does not need to know the location of the data. Using the inventory services layer in both source and destination environments, a propagation tool can compare data sets referenced by corresponding unique identifiers within the inventories and determine the differences between the environments based upon the inventory. The propagation tool may utilize the inventory services layer in the destination environment to propagate changes from one environment to another environment.

FIG. 1 illustrates a high-level overview of an interaction between a source environment 105 and a destination environment 145 in an embodiment. The source environment 105 and destination environment 145 are environments in which portal applications are deployed in association with a central portal. In some embodiments, the source environment 105 is a testing and deployment environment in which applications are tested and evaluated and the destination environment 145 is an environment in which applications are deployed for their intended functions.

The applications 108, 110, 120, 125 are portal applications stored in the source environment that perform various services and functions in association with the central portal. The propagation tool 140 is a utility that is used to propagate applications and changes to applications from the source environment 105 to the destination environment 145. In one embodiment, the propagation tool 140 copies an entire application from the source environment to the destination environment to generate one of the applications 150, 155 stored in the destination environment. In an alternate embodiment, the propagation tool 140 compares an application 120 in the source environment to a corresponding application 150 in the destination environment 145, determines the differences between the two applications, and modifies the application 150 in the destination environment to match the application in the source environment 105.

Figure 2:
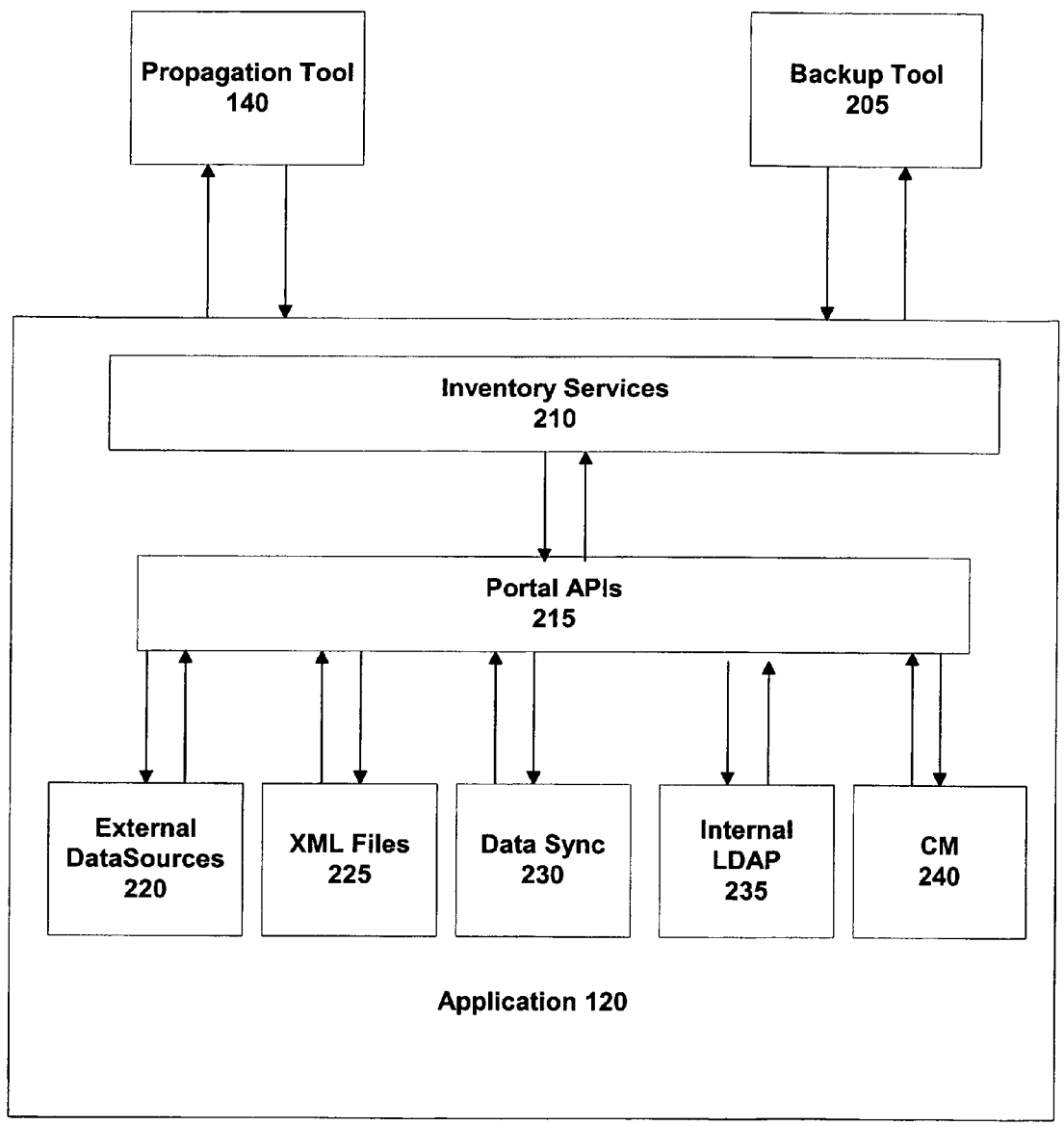
FIG. 2 illustrates another high-level overview of an application and its interaction with a backup tool and a propagation tool in an embodiment.

FIG. 2 illustrates another high-level overview of the application 120 and its interaction with the propagation tool 140 and a backup tool 205 in an embodiment. The application 120 includes an inventory services layer 210 and portal Application Programming Interfaces (APIs) 215. It additionally includes various inventory data sources, namely external data sources 220, extensible Markup Language (XML) files 225, datasync data 230, internal Lightweight Directory Access Protocol information 235, and Content Management (CM) information. The inventory data sources store inventory data, which includes configuration data, render data, user customization information, and user data such as profiles, behavior tracking, and ad views.

The backup tool 205 is configured to generate backups of portal applications. In some embodiments, when restoring from a backup, the backup tool 205 compares a current application to an existing backup and modifies those aspects of the current application that differ from those of the backup. When generating a backup, the backup tool can perform the reverse function and modify those aspects of an existing backup that differ from a current application.

In some embodiments, the backup 205 and propagation 140 tools operate through a client/server model, with the tools using source data on a client to modify destination data on the server. These tools can store inventory data, configuration differences and proposed configuration changes as XML files. The backup tools can be invoked from a user interface, such as a Graphical User Interface (GUI) or a script. While in the embodiments illustrated herein, the user interface is a GUI, in alternate embodiments any number of interfaces, including text interfaces, voice interfaces, touchscreens, or any other type of interface can be used.

The external data sources 220 are data sources outside the application 120 that are used to configure or otherwise support the application. While FIG. 2 illustrates the external data sources as being within the application, in some embodiments they are associated with the application, but located outside of the application. The XML files 225 are files storing data and configuration information for the application. The datasync data 230 is data that has been generated by or stored for a runtime configuration utility. The internal LDAP 235 stores security values indicating who is able to access resources associated with the application 120. The CM 240 includes graphics and rendering information that is displayed in association with the portal application.

The portal APIs are used to access and manipulate the various inventory data sources 220, 225, 230, 235. In some cases, the portal APIs are utilized by the inventory services 210, but primarily they are utilized during the normal creation and utilization of the application 120.

The inventory services layer 210 is configured to receive requests from the propagation tool 140 and backup tool 205. These requests take the form of requests to retrieve inventory data stored in the various inventory data sources and requests to modify the inventory data stored in the various inventory data services. The inventory services layer abstracts all of the data access to the sources below it, so that the propagation tool 140 only needs to submit a request for certain data, and the inventory services layer locates and either provides or modifies the data.

The inventory services layer 210 performs a certain number of information retrieval services. These services include a listing service that indicates all of the subcategories within a particular category, such as all the portlets defined for a particular web application. The services further include a dependency service that indicates what elements are needed to run a particular application, such as which portlets are associated with particular pages or portals. It additionally includes an identity function that can provide previous names for particular data values. In addition to the functions above that retrieve particular pieces of data, the inventory services layer also includes update services that can delete, modify, or create inventory data. While the above services are discussed for illustrative purposes, the inventory services layer 210 can be configured to perform any number of retrieval or updating services.

Figure 3:
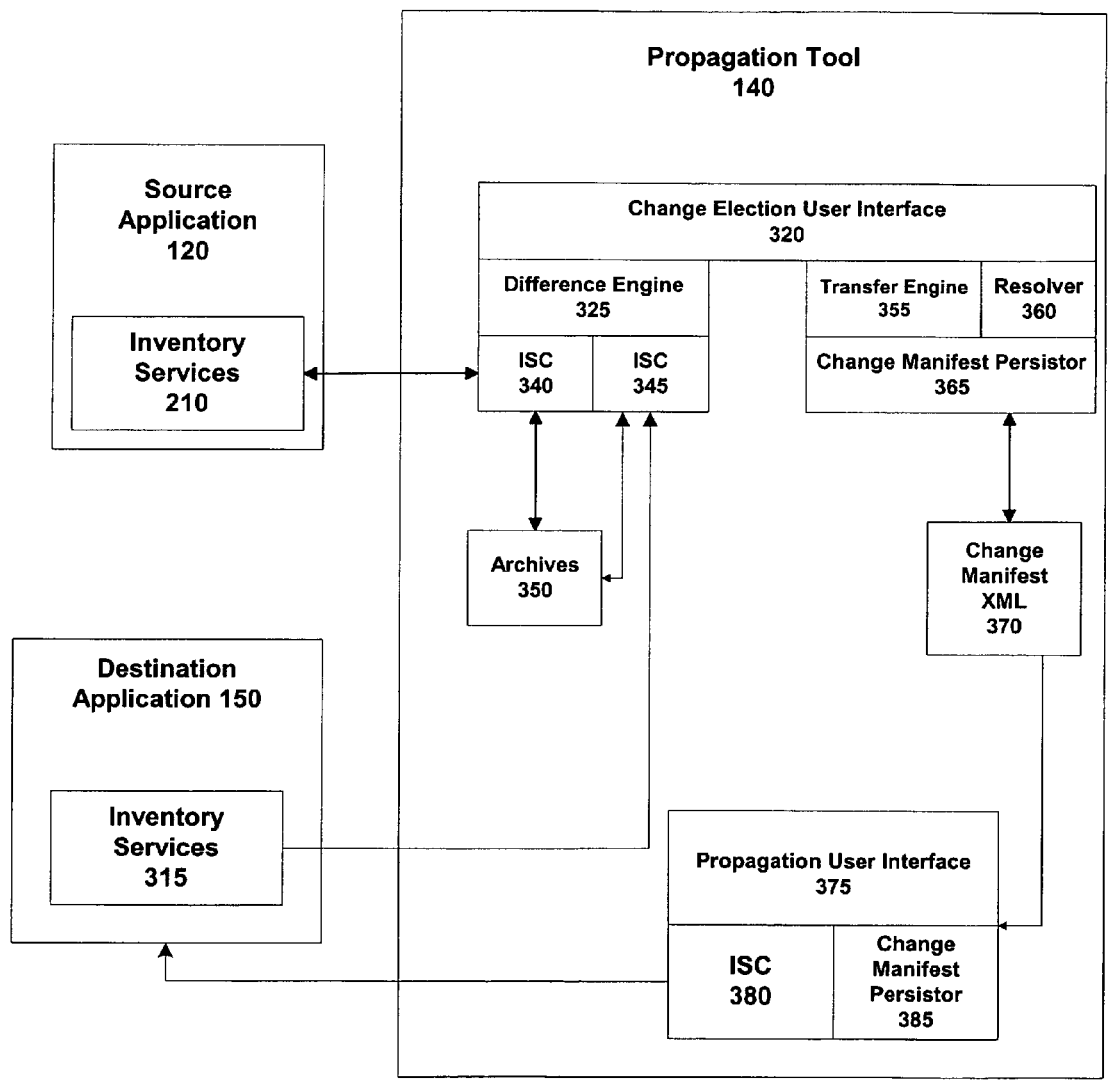
FIG. 3 illustrates a high-level overview of a system for propagating changes from a source application to a backup application in an embodiment.

FIG. 3 illustrates a high-level overview of a system for propagating changes from a source application to a backup application in an embodiment. The propagation tool 140 is configured to propagate changes between a source application 120 in the source environment 105 of FIG. 1 and a destination application 150 in the destination environment of FIG. 1. While in the present embodiment the two applications are located in different environments, in alternate embodiments, the two applications can be located in the same environment. In one embodiment, the source application 120 is a modified or adjusted version of the destination application 150, that having been tested in a testing environment, is having its configuration changes propagated to the destination application.

The propagation tool includes a number of Inventory Services Consumers (ISCs) 340, 345, 380 that are configured to communicate with the inventory services layers 210, 315 of the source 120 and destination 150 applications. These consumers 340, 345, 380 are configured to perform the varying inventory retrieval and update services discussed with respect to FIG. 2 and are the primary mechanism by which the propagation tool 140 interacts with the applications 120, 150.

Two ISCs 340, 345 gather inventory data from the applications through the inventory services layers 210, 315 and store the information in the inventory archives 315. While in one embodiment, this inventory data is selected from the inventory sources described in FIG. 2, in alternate embodiments, other data sources may be utilized as well. The first ISC 340 develops a "snapshot" of all of the inventory data in the source application 120 and stores the data in an XML file in the archives 350. The second ISC 345 generates a similar snapshot of all of the data stored in the destination application 150 and similarly stores the information in the archives 350.

An inventory difference engine 325 reads the XML data stored in the archives 350, compares the source and destination inventory data gathered by the ISCs 340, 345, and determines the differences between the two applications. In some embodiments, the archives 350 also store historical data about the state of the two applications 120, 150 throughout different points in time and the inventory difference engine utilizes this information to determine the differences between the two applications 120, 150.

These differences can be viewed through a change election user interface 320. The change election user interface provides a graphical listing of some or all differences between the two applications. The differences can be organized according to types of information, sources of information, or any other system of organization.

The change election user interface 320 can then be utilized to select which inventory data in the source application 120 should be propagated to the destination application 150. In one embodiment, a user can manually select through the user interface which differences will modified or which configuration values that are in the source application 120 should be propagated to the destination application 150.

In an alternate embodiment, a user can designate preselected rules which indicate which differences should be propagated from the source application to the destination application and which changes should be ignored.

A resolver 360 allows the designation of post-processing changes to be performed on various pieces of inventory data once the data is on the destination server. For example, an administrator adding a portlet to a desktop page in staging could set a rule that any visitor-customized view of the page should updated to view the new portlet. A transform engine 355 can designate changes that should be performed on inventory data as it is transferred to a new environment.

The changes that are selected are then stored in a change manifest.xml file by a first change manifest persistor 365. While in the present embodiment, the changes are stored in an XML file, in alternate embodiments, any number of file formats can be used.

The propagation tool user interface allows a user to invoke a propagation request. A second change manifest persistor 385 reads all of the changes stored in the change manifest 370 and passes them to a third ISC 380. The third ISC 380 updates the relevant inventory data in the application 150 through its inventory services 315. At this point, any requested changes have been propagated from the source application 120 to the destination application.

Figure 4A:
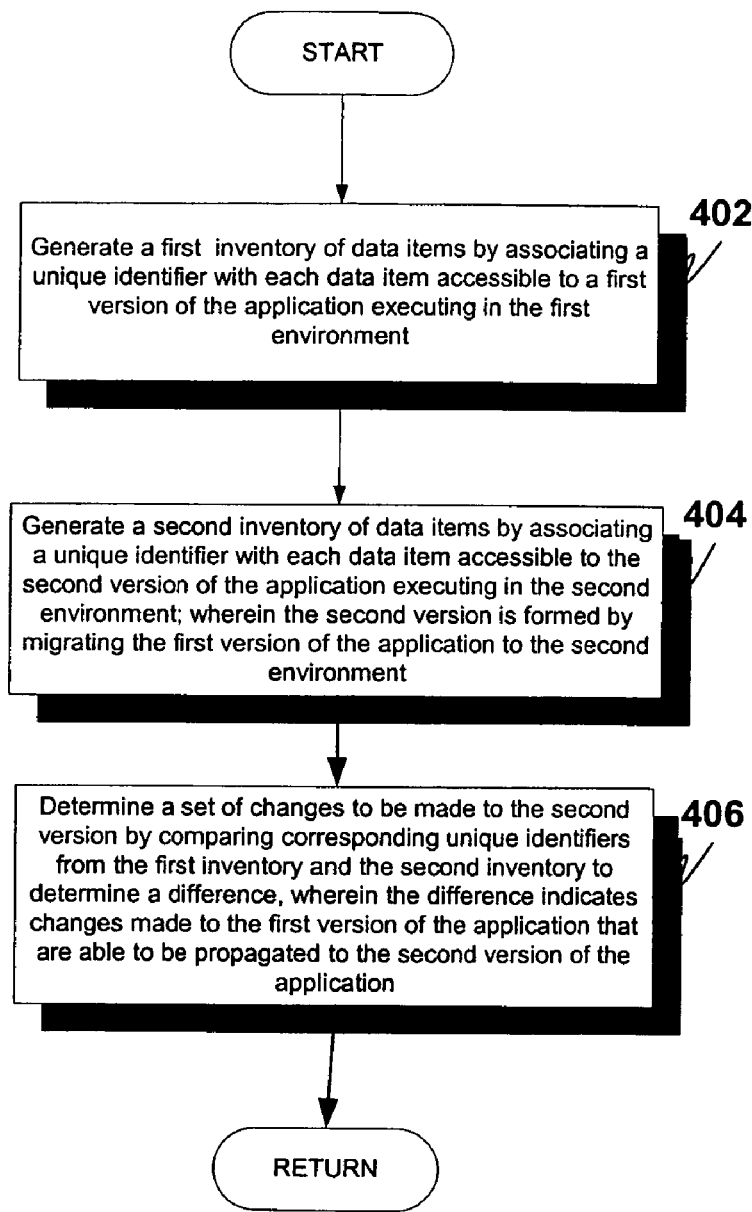
FIG. 4A illustrates a flowchart that provides a high-level overview of processing for propagating changes to an application in an embodiment.

FIG. 4A illustrates a flowchart that provides a high-level overview of processing for propagating changes to an application in an embodiment. The technique for propagating changes shown in FIG. 4A is operable with a propagation tool, such as propagation tool 140 of FIG. 1, for example. As shown in FIG. 4A, a first inventory of data items is generated by associating a unique identifier with each data item accessible to a first version of the application residing in the first environment (block 402). A second inventory of data items is generated by associating a unique identifier with each data item accessible to the second version of the application residing in the second environment (block 404). In an embodiment, the second version can be formed by migrating the first version of the application to the second environment. In other embodiments, the versions may be created independently or derived from a third common version or the like. A set of changes to be made to the second version is determined (block 406) by comparing corresponding unique identifiers from the first inventory and the second inventory to determine a difference. The difference indicates changes made to the first version of the application that can be propagated to the second version of the application.

Figure 4B:
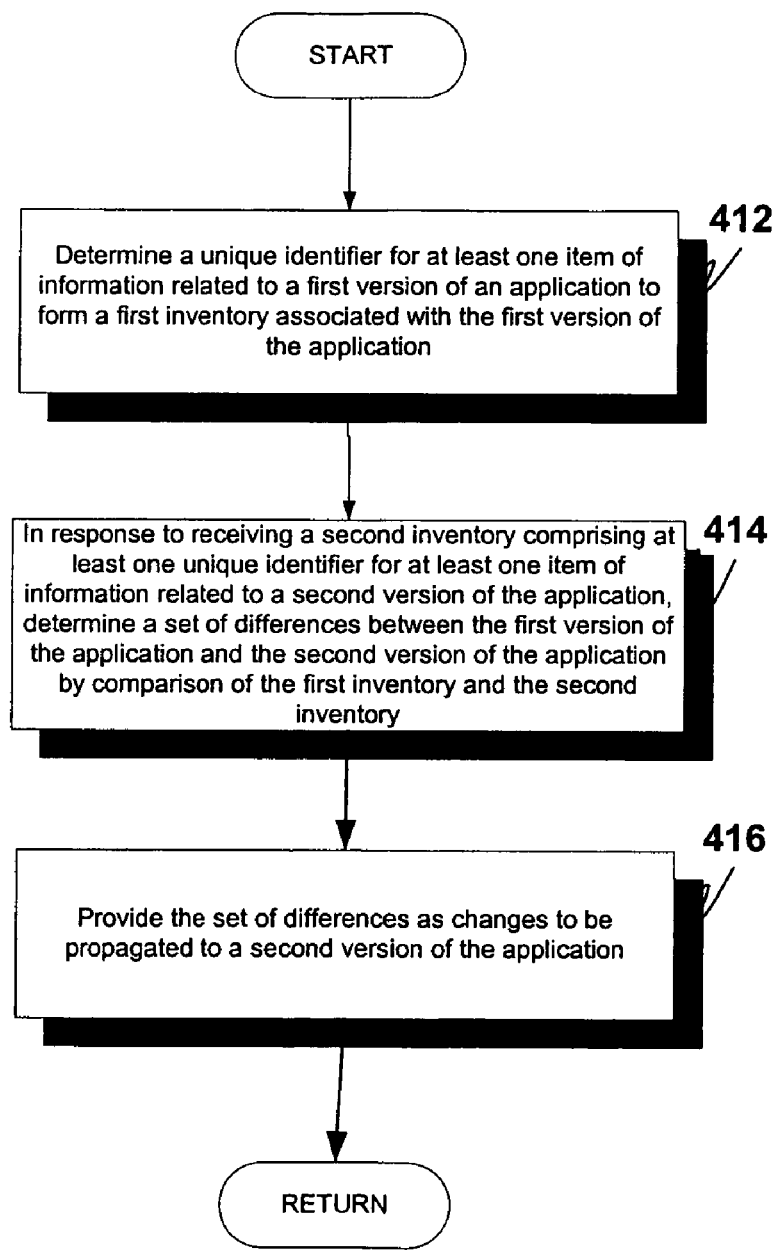
FIG. 4B illustrates a flowchart that provides a high-level overview of processing for determining changes to propagate in an embodiment.

FIG. 4B illustrates a flowchart that provides a high-level overview of processing for determining changes to propagate in an embodiment. The technique for propagating changes shown in FIG. 4B is operable with a propagation tool, such as propagation tool 140 of FIG. 1, for example. As shown in FIG. 4B, a unique identifier is determined for at least one item of information related to a first version of an application to form a first inventory associated with the first version of the application (block 412). In response to receiving a second inventory comprising at least one unique identifier for at least one item of information related to a second version of the application, a set of differences between the first version of the application and the second version of the application is determined (block 414) by comparison of the first inventory and the second inventory. The set of differences is provided (block 416) as changes to be propagated to a second version of the application.

Figure 5:
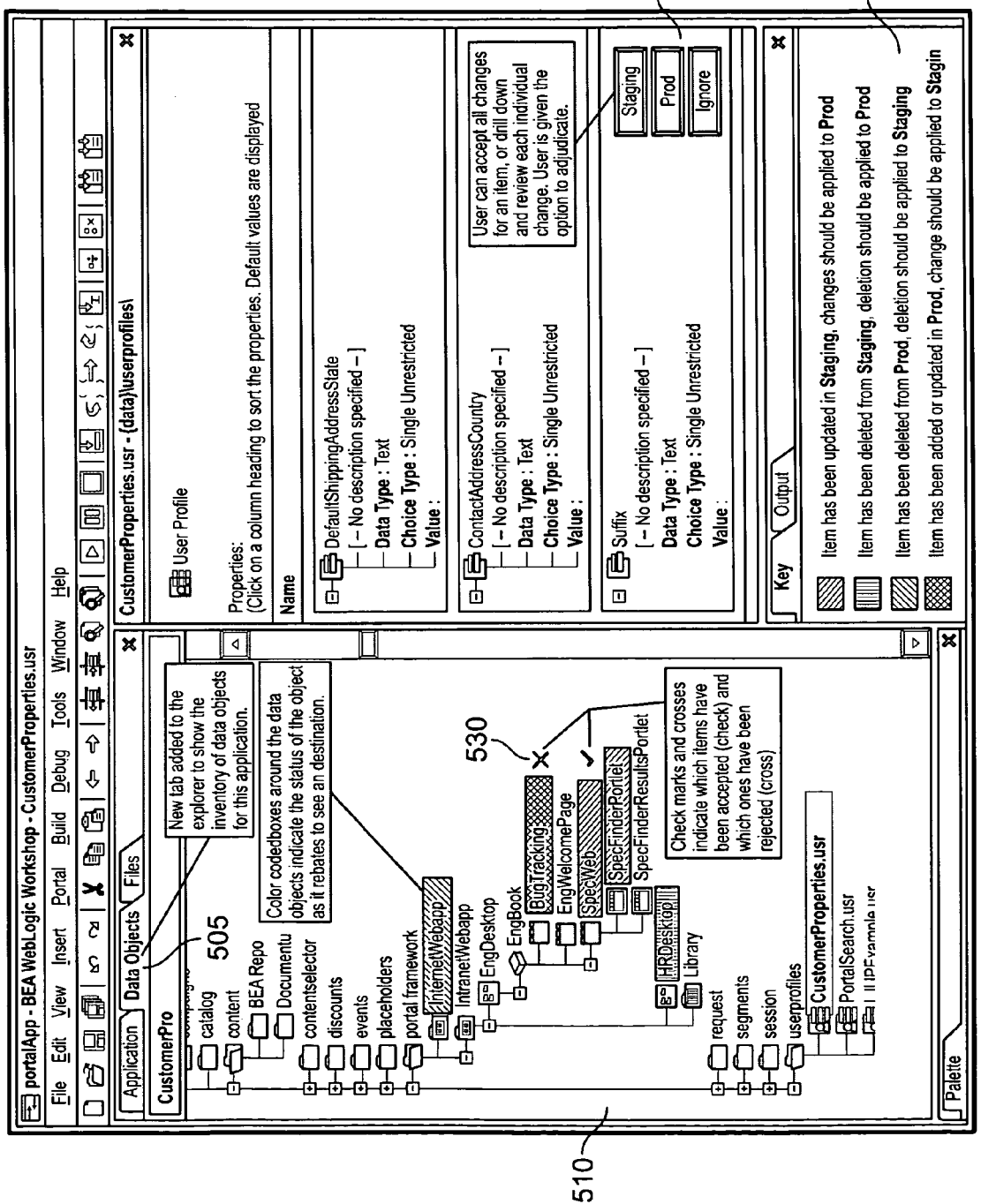
FIG. 5 illustrates a high-level overview of a user interface for performing propagation activities in an embodiment.

FIG. 5 illustrates a high-level overview of a user interface for performing propagation activities in an embodiment. An object type setting 505 enables a user to select different types of inventory data to be displayed in a main window 510. The main window 510 displays a text tree listing objects of a particular type. The interface optionally includes a series of color or shaded codes indicating how a particular item differs between the source and destination sites and whether the differences should be propagated to the source application or destination application as indicated in the legend 525 for the shading codes. The differing items also have markers 530 indicating whether the changes indicated by the color codes have been accepted or rejected by a user through an acceptance/rejection interface 520 adjoining the main window 500.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed:

1. A method for propagating changes to a portal application between a source environment and a destination environment, the method comprising:

providing a first version of a portal application, stored in a source environment at a first computer including a computer readable storage medium and processor operating thereon, wherein the first version of the portal application has a first inventory services layer associated therewith which abstracts data access to the first version of the portal application, and wherein the source environment includes a plurality of different portal applications;

providing a second version of the portal application, stored in a destination environment at a second computer including a computer readable storage medium and processor operating thereon, wherein the second version of the portal application has a second inventory services layer associated therewith which abstracts data access to the second version of the portal application;

providing a propagation tool operable to propagate selectively the plurality of portal applications and changes to each of the plurality of portal applications from the source environment to the destination environment using inventory services consumers (ISCs);

generating a first inventory of data items by the propagation tool, including
  accessing the first inventory services layer using a first ISC in the propagation tool, and
  associating a unique identifier with each data item accessible to the first version of the portal application residing in the source environment on the first computer;

generating a second inventory of data items by the propagation tool, including
  accessing the second inventory services layer using a second ISC in the propagation tool, and
  associating a unique identifier with each data item accessible to the second version of the portal application residing in the destination environment on the second computer;

comparing, by an inventory difference engine, corresponding unique identifiers from the first inventory and the second inventory to determine differences between the inventories, wherein each difference indicates a change made to the first version of the portal application which can be propagated to the second version of the portal application;

displaying, in a change election user interface, a list of the differences;

receiving a selection of a subset of the differences between the inventories as a set of changes to be made to the second version of the portal application; and upon receiving a propagation request,
  reading the set of changes, and
  updating, using a third ISC in the propagation tool and the second inventory services layer, the second version of the portal application by the propagation tool according to the set of changes.

2. The method of claim 1, further comprising:
receiving one or more changes made to the first version of the portal application.

3. The method of claim 1, wherein comparing corresponding unique identifiers from the first inventory and the second inventory to determine a difference between the inventories comprises:
determining a logical difference by comparing logical attributes of the data items reflected in the unique identifier.

4. The method of claim 1, wherein comparing corresponding unique identifiers from the first inventory and the second inventory to determine a difference between the inventories comprises:
comparing an extensible markup language (XML) format file comprising the unique identifiers for the first inventory with an extensible markup language (XML) format file comprising the unique identifiers for the second inventory.

5. The method of claim 1, wherein the first version of the portal application comprises a test version in a test environment.

6. The method of claim 5, wherein the second version of the portal application comprises a production version in a production environment.

7. The method of claim 1, wherein generating a first inventory of data items by a propagation tool comprises:
generating a first inventory of data sources storing information about at least one of: a state of the first version of the application, user customization data, render information.

8. The method of claim 1, wherein comparing corresponding unique identifiers from the first inventory and the second inventory to determine a difference between the inventories comprises:
storing a proposed change in a change manifest; and
prompting a user to accept the proposed change.

9. The method of claim 1, wherein the second version is formed by migrating the first version of the portal application to the second environment.

10. The method of claim 1, wherein environment comprises a set of characteristics of a computer configuration, including at least one of hardware characteristics and software characteristics.

11. The method of claim 1, wherein an application comprises at least one of a data entry, an update, a query or a program, which processes data on behalf of a user.

12. The method of claim 1 further comprising:
designating, using a transfer engine in the propagation tool, additional changes to be made to the second version of the portal application while the second version of the portal application is being updated; and
designating, using a resolver module in the propagation tool, a plurality of post-processing changes to be made to the second version of the portal application after the second version of the portal application has been updated.

13. The method of claim 12 wherein all of the changes are stored in a change manifest that is used by the third ISC when updating the second version of the portal application.

14. A computer readable medium carrying one or more sequences of instructions for propagating changes to an application between a source environment and a destination environment, which instructions, when executed by one or more processors, cause the one or more processors to carry out the steps of:
providing a first version of a portal application, stored in a source environment at a first computer including a computer readable storage medium and processor operating thereon, wherein the first version of the portal application has a first inventory services layer associated therewith which abstracts data access to the first version of the portal application, and wherein the source environment includes a plurality of different portal applications;
providing a second version of the portal application, stored in a destination environment at a second computer including a computer readable storage medium and processor operating thereon, wherein the second version of the portal application has a second inventory services layer associated therewith which abstracts data access to the second version of the portal application;
providing a propagation tool operable to propagate selectively the plurality of portal applications and changes to each of the plurality of portal applications from the source environment to the destination environment using inventory services consumers (ISCs);
generating a first inventory of data items by the propagation tool, including
accessing the first inventory services layer using a first ISC in the propagation tool, and
associating a unique identifier with each data item accessible to the first version of the portal application residing in the source environment on the first computer;
generating a second inventory of data items by the propagation tool, including
accessing the second inventory services layer using a second ISC in the propagation tool, and
associating a unique identifier with each data item accessible to the second version of the portal application residing in the destination environment on the second computer;
comparing, by an inventory difference engine, corresponding unique identifiers from the first inventory and the second inventory to determine differences between the inventories, wherein each difference indicates a change made to the first version of the portal application which can be propagated to the second version of the portal application;
displaying, in a change election user interface, a list of the differences;
receiving a selection of a subset of the differences between the inventories as a set of changes to be made to the second version of the portal application; and
upon receiving a propagation request,
reading the set of changes, and
updating, using a third ISC in the propagation tool and the second inventory services layer, the second version of the portal application by the propagation tool according to the set of changes.

15. The computer readable medium of claim 14, further comprising instructions for carrying out the step of:
receiving one or more changes made to the first version of the portal application.

16. The computer readable medium of claim 14, wherein the instructions for comparing corresponding unique identifiers from the first inventory and the second inventory to determine a difference between the inventories include instructions for carrying out the step of:
determining a logical difference by comparing logical attributes of the data items reflected in the unique identifier.

17. The computer readable medium of claim 14, wherein the instructions for comparing corresponding unique identifiers from the first inventory and the second inventory to determine a difference between the inventories for carrying out the step of:
   comparing an extensible markup language (XML) format file comprising the unique identifiers for the first inventory with an extensible markup language (XML) format file comprising the unique identifiers for the second inventory.

18. The computer readable medium of claim 14 further comprising instructions for carrying out the steps of:
   designating, using a transfer engine in the propagation tool, additional changes to be made to the second version of the portal application while the second version of the portal application is being updated; and
   designating, using a resolver module in the propagation tool, a plurality of post-processing changes to be made to the second version of the portal application after the second version of the portal application has been updated.

19. The computer readable medium of claim 18 wherein all of the changes are stored in a change manifest that is used by the third ISC when updating the second version of the portal application.

20. The computer readable medium of claim 14, wherein the first version of the portal application comprises a test version in a test environment.

21. The computer readable medium of claim 20, wherein the second version of the portal application comprises a production version in a production environment.

22. The computer readable medium of claim 14, wherein the instructions for generating a first inventory of data items by a propagation tool include instructions for carrying out the step of:
   generating a first inventory of data sources storing information about at least one of: a state of the first version of the application, user customization data, render information.

23. The computer readable medium of claim 14, wherein the instructions for comparing corresponding unique identifiers from the first inventory and the second inventory to determine a difference between the inventories include instructions for carrying out the steps of:
   storing a proposed change in a change manifest; and
   prompting a user to accept the proposed change.

24. The computer readable medium of claim 14, wherein the second version is formed by migrating the first version of the portal application to the second environment.

25. An apparatus for managing applications, the apparatus comprising:
   a processor; and
   one or more stored sequences of instructions which, when executed by the processor, cause the processor to carry out the steps of:
      providing a first version of a portal application, stored in a source environment at a first computer including a computer readable storage medium and processor operating thereon, wherein the first version of the portal application has a first inventory services layer associated therewith which abstracts data access to the first version of the portal application, and wherein the source environment includes a plurality of different portal applications;
      providing a second version of the portal application, stored in a destination environment at a second computer including a computer readable storage medium and processor operating thereon, wherein the second version of the portal application has a second inventory services layer associated therewith which abstracts data access to the second version of the portal application;
      providing a propagation tool operable to propagate selectively the plurality of portal applications and changes to each of the plurality of portal applications from the source environment to the destination environment using inventory services consumers (ISCs);
      generating a first inventory of data items by the propagation tool, including
         accessing the first inventory services layer using a first ISC in the propagation tool, and
         associating a unique identifier with each data item accessible to the first version of the portal application residing in the source environment on the first computer;
      generating a second inventory of data items by the propagation tool, including
         accessing the second inventory services layer using a second ISC in the propagation tool, and
         associating a unique identifier with each data item accessible to the second version of the portal application residing in the destination environment on the second computer;
      comparing, by an inventory difference engine, corresponding unique identifiers from the first inventory and the second inventory to determine differences between the inventories, wherein each difference indicates a change made to the first version of the portal application which can be propagated to the second version of the portal application;
      displaying, in a change election user interface, a list of the differences;
      receiving a selection of a subset of the differences between the inventories as a set of changes to be made to the second version of the portal application; and
      upon receiving a propagation request,
         reading the set of changes, and
         updating, using a third ISC in the propagation tool and the second inventory services layer, the second version of the portal application by the propagation tool according to the set of changes.

26. A method for propagating changes to an application between a source environment and a destination environment, the method comprising:
   providing a first version of a portal application, stored in a source environment at a first computer including a computer readable storage medium and processor operating thereon, wherein the first version of the portal application has a first inventory services layer associated therewith which abstracts data access to the first version of the portal application, and wherein the source environment includes a plurality of different portal applications;
   providing a second version of the portal application, stored in a destination environment at a second computer including a computer readable storage medium and processor operating thereon, wherein the second version of the portal application has a second inventory services layer associated therewith which abstracts data access to the second version of the portal application;
   providing a propagation tool operable to propagate selectively the plurality of portal applications and changes to each of the plurality of portal applications from the source environment to the destination environment using inventory services consumers (ISCs);

generating a first inventory of data items by a propagation tool, including
  accessing the first inventory services layer using a first ISC in the propagation tool, and
  associating a unique identifier with each data item accessible to the first version of the portal application residing in the source environment on the first computer;
propagating, using a second ISC, to a second version of the application in the destination environment, a set of changes determined by comparing, by an inventory difference engine, corresponding unique identifiers from the first inventory and a second inventory, generated by the second ISC, for the second version of the application, wherein the comparing determines differences between the inventories indicating changes made to the first version of the application that can be propagated to the second version of the application and wherein the set of changes is a subset of the differences between the inventories; and
updating, using a third ISC in the propagation tool, the second version of the portal application by the propagation tool according to the set of changes.

* * * * *